United States Patent [19]

Markfort

[11] 4,308,107
[45] Dec. 29, 1981

[54] DISTILLATION PROCESS AND APPARATUS FOR ITS REALIZATION

[76] Inventor: Dieter Markfort, Am Tor 2, 5064 Rösrath 3, Fed. Rep. of Germany

[21] Appl. No.: 705

[22] Filed: Jan. 3, 1979

[30] Foreign Application Priority Data

Jan. 4, 1978 [DE]   Fed. Rep. of Germany ....... 2800247
Nov. 11, 1978 [DE]  Fed. Rep. of Germany ....... 2849076

[51] Int. Cl.³ ............................................. B01D 3/26
[52] U.S. Cl. ......................................... 203/23; 203/25; 202/158; 202/159; 202/179; 202/198
[58] Field of Search ........................ 203/23, 25, 87, 99; 202/158, 179, 198, 199, 159; 196/102, 139, 140; 62/31, 34; 165/105, 110, 166

[56] References Cited

U.S. PATENT DOCUMENTS

| | | | |
|---|---|---|---|
| 1,282,324 | 10/1918 | Tschudy | 202/158 |
| 1,541,227 | 6/1925 | Kelly | 202/198 |
| 1,658,322 | 2/1928 | Bernard | 202/161 |
| 1,804,553 | 5/1931 | Dubbs | 196/139 |
| 2,317,101 | 4/1943 | Lecky | 202/158 |
| 2,333,712 | 11/1943 | Eckey | 202/198 |
| 2,760,351 | 8/1956 | Schilling | 202/158 |
| 2,995,499 | 8/1961 | Dukler et al. | 202/158 |
| 3,233,389 | 2/1966 | Dahlen | 202/158 |
| 3,516,261 | 6/1970 | Hoffman | 62/34 |
| 3,535,886 | 10/1970 | Hoffman | 202/158 |
| 3,535,887 | 10/1970 | Hoffman | 62/34 |
| 3,568,460 | 3/1971 | Hoffman | 202/158 |
| 3,568,461 | 3/1971 | Hoffman | 202/158 |
| 3,568,462 | 3/1971 | Hoffman | 202/158 |
| 3,625,016 | 12/1971 | Hoffman | 62/34 |
| 3,625,017 | 12/1971 | Hoffman | 62/34 |
| 3,983,191 | 9/1976 | Schauls | 202/158 |
| 4,025,398 | 5/1977 | Haselden | 202/158 |

Primary Examiner—Wilbur L. Bascomb, Jr.
Attorney, Agent, or Firm—Holman & Stern

[57] ABSTRACT

A method and apparatus for distillation wherein the heat of partial condensation and the heat of evaporation are incrementally utilized as produced thus guiding the gaseous phase of the distillation along the dew-point line of the enthalpy-concentration diagram and guiding the fluid phase along the bubble-point line of the enthalpy-concentration diagram of the mixture to be rectified.

9 Claims, 1 Drawing Figure

U.S. Patent      Dec. 29, 1981      4,308,107
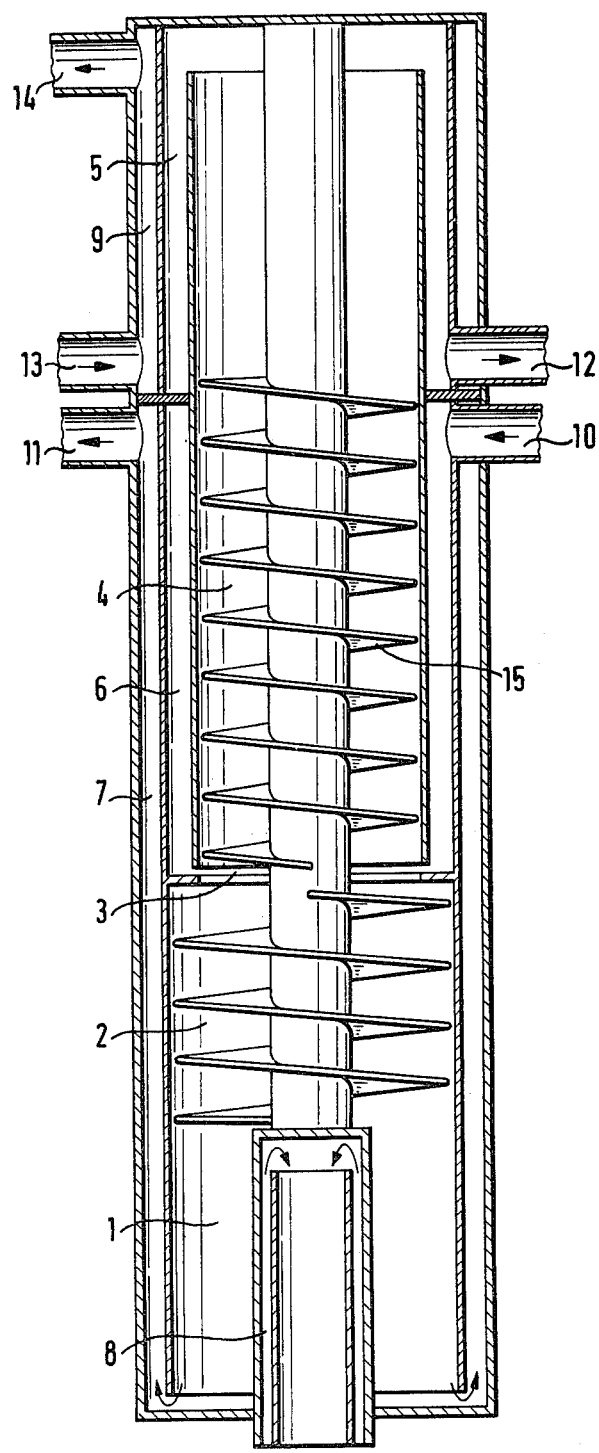

DISTILLATION PROCESS AND APPARATUS FOR ITS REALIZATION

BACKGROUND OF THE INVENTION

The invention refers to a distillation process, whereby a liquid mixture of a multitude of compounds of varying volatility is being separated, by means of partial evaporation, into a gaseous phase having a high concentration of the more volatile components, and into a fluid phase having a lower concentration of the more volatile components; whereby in order to obtain a maximum purity of the more volatile components the gaseous phase is brought into close contact with a dephlegmate or reflux produced by partial condensation (rectifying procedure) and whereby for the purpose of obtaining an extensive reduction of the compound of the more volatile component the vapor, which evolves from the heating, enters into a concentration exchange with the liquid phase of the compound (stripping process); and an apparatus for performing this method.

Such processes are well known in the chemical processing industry and have been treated in detail, for example, by F. Bosnjakovic, "Technische Thermodynamik, II. Teil, 5. Auflage, Verlag Theodor Steinkopf, Dresden and Leipzig, 1971". Thus, chapter 5 contains an analysis in which the principle of the rectifying process by forming a dephlegmate or reflux, on one hand, and by external heating, on the other hand, is described.

From this description may easily be noted that the dephlegmation heat prevails at the dew-point temperature of the highest concentration of the gaseous phase, namely, the lowest process-temperature, and the evaporation heat at the boiling-point temperature of the lowest concentration of the fluid phase, namely, the highest process temperature, which is at an always constant temperature.

Since in both cases the amount of heat is relatively large, this type of method, according to the second law of thermodynamics, involves great losses. This becomes especially obvious when one intends to recuperatively utilize the respective amounts of heat.

It is an object of the present invention to provide a method wherein the developing dephlegmation heat is utilized at temperatures which are as high as possible, and the evaporation heat is utilized at temperatures which are as low as possible.

Based on the above-described prior art method, this problem is inventively solved in that the total dephlegmation heat, which is transmitted from the gaseous phase to a heat sink, is divided into random small portions, which are then extracted from the gaseous phase along the total area of the rectifying procedure, and thus producing correspondingly small amounts of dephlegmate, thereby guiding the gaseous phase along the dew-point line in the enthalpy-concentration diagram, and that the stripping process is initiated by dividing the warming heat into random small portions, which are made available by the heat source, producing thereby locally correspondingly small amounts of vapor, and in this manner the fluid phase is guided along the boiling-point or bubble-point line in the enthalpy-concentration diagram.

As far as the technology of the method is concerned, the inventive process produces the same effect as in the prior art methods, namely, on one hand, in the area of rectification to enrich the gaseous phase along the dew-point line by means of cooling and equilibrating the concentration balancing with the locally prevailing fluid phase, and, on the other hand, to strip the mixture to reduce the more readily volatile compounds along the boiling point curve by heating. In the prior art methods, there is, however, additionally produced a correspondingly high dephlegmate a reflux in the lowest process temperatures, which absorbs the heat necessary for the cooling through internal processes, and, on the other hand, the compound, at the highest process temperature, is evaporated to such an extent that the heat necessary for the stripping becomes available.

The heat, which has been internally transmitted in this manner, is lost to the process in an energetic regard since the dephlegmation temperature, measured at the highest boiling-point temperature, is very low, and the total temperature integral is required for the internal heat transfer, but cannot be utilized externally.

In contrast to this, in the inventive process there is only so much heat removed at each point along the dew-point curve as will be required for the local improvement of the concentration of lower volatile components in the gaseous phase concentration equilibrium with the fluid phase. The local temperature thereby remains the same, and also the local mass balance is identical with that of the prior art method. The heat extracted by cooling is obtained basically at the locally-prevailing temperature. In the inventive method, it is, for example, possible to heat a fluid-flow, which is being utilized for cooling, from the lowest process temperature up to the maximum dew-point temperature of the process.

In an analogeous manner, in the inventive process there is only so much heat supplied at each point along the boiling-point line as will be required for the local stripping of the mixture—by means of a concentration balance with the gaseous phase. The local temperature is thereby retained, as is also the local mass balance corresponding entirely with that of the prior art method. The heat which is supplied by external heating is thereby fed in at the locally prevailing temperature. In the inventive method, it is possible, for example, to cool a fluid-stream which is used for heating from the highest process temperature down to the lowest boiling-point temperature of the process.

This provides for the possibility of a suitable guiding of the heating-and cooling-flows, to obtain a substantial improvement of the thermal efficiency distillation methods.

The herein mentioned improvement of the efficiency may advantageously be obtained by guiding the fluid-streams which are used for cooling or heating in a counter-flow to the main material flows of rectification.

A preferred embodiment of the invention is a process whereby the mixture to be separated is used as the coolant for the production of the dephlegmate since a maximum initial heat temperature can be obtained in this manner. Analogous to this, the stripped fluid phase of the compound is being utilized as the heating fluid for performing the distillation process, which is able to produce the externally-absorbed heat and sensible heat down to the minimum boiling-point temperature, so that in this manner a minimum outlet temperature of the stripped liquid phase can be obtained. The remaining sensible heat will be available for initial heating purposes.

A preferred application of the present invention pertains to continuous processes which are operated in the sense of absorption-heat-pumps and/or absorption-refrigerating machines. Since in both cases the transforming of heat from a lower to a higher temperature level is effected by the utilization of thermal energy, an improvement of the ratio of produced heat to the utilized heat for the utilization of such continuous processes is of fundamental importance. By means of preheating the mixture to be separated, there results in a substantial savings in heating energy.

The inventive rectification method in a multi-level embodiment is of especial advantage with regard to the utilization of the supplied heat for separating the mixture. The multi-level rectification in a cascade arrangement offers the possibility, by means of a suitable selection of the respective operating conditions (pressure and temperature), to utilize the condensation heat of the first stage, which is operated at a higher pressure, as evaporation heat in the second stage which has a lower pressure level. Similarly, it is possible in the conventional manner to utilize the absorption heat of the first stage as the heating energy in the second stage. With this arrangement, the energy of the external heat which is provided in the high pressure stage, is utilized much more efficiently and thus results in a noticable increase of the specific compound stripping performance, or a better thermal efficiency.

For performing this distillation process, it is recommended to utilize an apparatus for thermal separation of fluid mixtures of components of varying volatility by means of partial evaporation and recondensation, comprising a feed-zone for the rich solution, a rectifying column for concentration of the lower volatile components in the gaseous phase, a stripping column for stripping the supplied rich solution of the more volatile components, a reboiler, in which the more volatile components are being evaporated by means of heat addition, and from which the stripped solution is being removed, a condenser for condensation of the vapor of the more volatile components, and a recuperator for transmitting heat from the stripped solution to the fed in rich solution, whereby the rich solution is being utilized for cooling of the rectifying section, thus causing a reflux, and the stripping solution transferring a portion of its sensible heat to the stripping section which is inventively characterized in that the flow channel of the rich solution is provided with two separate heat-transfer surfaces (duct walls), one of which borders the rectifying section and the other borders the flow of the stripped solution; and that, additionally, the flow duct of the stripped solution in the area of the stripping section shares a mutual heat-transferring wall with the latter.

On the basis of this constructive arrangement, the flows of vapor of rich and stripped solutions are guided mainly parallel in the area of the rectifying section, whereby the feed product flows counter-current relationship to the vapor and the stripped solution, while in the area of the stripping section the stripped solution flows substantially in a counter-current fashion to the substance-flow of the stripping section.

The inventive process prevents heat-losses between stripping section and recuperator, since by means of the parallel arrangement there exist only the temperature differences which are required for the heat-transfer. Additionally, due to the bilateral heat-transfer to the rich solution, it has the effect that the mass flow of the rich solution need no longer be divided into two flow parts. The dividing of the amount of heat to be transferred from the rectifying section on one hand and from the stripped solution on the other hand to the rich solution, the surface conditions and temperature differences at both sides of the flow channel are automatically adjusted by means of the coefficient of heat-transmissions.

The mass flow of the stripped solution approximately assumes the function of a control parameter, while the column-temperature adjusts locally according to the local conditions. All disadvantages of a flow control loop are thereby eliminated, when basically the principle of the partial flows of the rich solution, which are adapted to the available heat, is being retained.

A further embodiment of the present invention proposes that the flow ducts be provided with an axial-symmetrical arrangement, whereby the rich solution flows into an annulus which surrounds the rectification section, or partial volume of the same, and on the outer surface of the rich solution flows the stripped solution, which itself encloses the stripping sections in an analogeous fashion. Such an embodiment is especially suitable for distillation units which are smaller or which are of modular construction. It is especially advantageous to completely prevent heat losses from the rectification or stripping sections. All heat losses are made up from the sensible heat of the stripped solution.

A preferred construction is especially useful for larger units in that the ducts of the rich and the stripped solutions are arranged within the rectifying and the stripping sections and in that the stripped solution flows in a duct which is surrounded by the rich solution. There can be a plurality of ducts for the rich and the stripped solutions. The ducts are arranged as helical tube bundles within the rectification or stripping sections, having a diameter which is small relative to the rectification unit. As mentioned above, the sizes which are predetermined for the heat transfer are simultaneously regulators for the industrial processing engineering steps. The proposed variants of arrangements permit the adaptation of the flow cross-sections and heat transfer areas to the product and heat flows. The multiple arrangement of flow ducts produces additionally a more even stress on the cross-sections of the rectifying and stripping sections.

The most important embodiment provides flow ducts formed by the circular cylindrical tubes. Even though the relations of heat-transferring circumference to cross-section in a circular tube are not easily optimal for certain cases of application, because of its availability, the circular tube is preferred as a structural element.

An embodiment which has a high adaptability to industrial requirements provides flow ducts of the rich solution and the stripped solution in the shape of plates, or components parts comprising plate elements. The advantages of such a solution are noticable especially in cases where the plate-shaped elements simultaneously form the trays of a column.

In a preferred embodiment of the present invention the walls of the flow ducts in the area of the rectifying and stripping sections are provided with an enlargement of the surface by means of fins which penetrate into the area of the column. Since a substantial element of the inventive process is the heat transfer from the column area to the product flows of the rich and the stripped solution, the enlargement of the heat-transferring surface has the significance of a free parameter, which along with parameters determine determine the heat-transfer (Reynold's and Prandtl's characteristic factors) are predetermined by the process-engineering boundary conditions of the components flows in the column area.

A favorable alternative for enlarging the surface area by means of fins is provided by the use of pin-shaped elements, for example, cylindrical or tapered pins or by means of fins. The mounting of individual pin-like elements is oftentimes preferred for functional-technical reasons (i.e., resistance welding) to the manufacturing of ribs; in addition, it results in advantages with regard to mixing the compound flows in the column which serves for an intensification of the heat-transfer.

Compared with the prior art construction of distillation columns as tray columns or packed columns, according to the instant inventive method, a repeated contact of the material streams in the column with the heat-transferring walls of the rich and the stripped solution is an advantage. For this reason, a preferred embodiment is characterized by the utilization of baffles in the column area, which simultaneously serve to provide for a wetted surface area which is as large as possible.

Measured on the component flows, relatively large amounts of heat must be transferred at the lowest-possible temperature differences. In many cases, the throughput are insufficient for producing the turbulent flows in a respective flow duct. A favorable form of the flow ducts in this sense is given in that the inner sides of the duct walls are provided with rough elements or roughened portions. These may be worked up by means of mechanical or galvanic erosion of the material, or also by depositing an external material (for example, flame spraying).

An improvement of the internal duct heat transfer may also be obtained by means of improved mixing of the component flow, so that a twisted flow develops. An advantageous duct structure for producing the "cross flow" includes providing the flow ducts with an irregularly structured insert (for example, porous tower packing, sinter material). This arrangement thus offers extensive advantages if a flow medium has a relatively poor heat transmittability by selecting a suitable material as a filler to create favorable heat-transfer normal to the direction of flow which substantially improves the heat transfer.

An alternative with regard to the irregularly structured channel filler is produced by providing the flow ducts with an regularly shaped insert. These include, especially smooth or helical wires or wire-structures. When the mass flows are not very small, these filler materials have the advantage of filling smaller cross-sectional areas of the duct, thereby producing a favorable mixing, and additionally being relatively non-susceptible to being clogged.

A preferred embodiment of the flow ducts, when considered from the view point of surface enlarging as well as the idea of mixing, provides that the flow ducts consists entirely or partially of corrugated tubes. While the natural enlarging of the surface area of the duct wall becomes evident by the insertion of the corrugated tubes, mixing effects are obtained as a result of the remaining duct dimensions. The smallest distance between shaft and the adjacent duct wall in relation to the shaft dimensions with regard to the consecutive local mixing thereby plays a substantial role. A further advantage is the relatively thin wall thickness as well as the elasticity in view of the thermal expansions.

DESCRIPTION OF THE PREFERRED EMBODIMENTS

The drawing illustrates a preferred embodiment of an apparatus for performing the inventive method.

The distillation unit comprises a reboiler 1, a stripping section 2, a feed zone 3 for a rich solution, a rectifying section 4, a condenser 5, a flow duct 6 for the rich solution, a flow duct 7 for the stripped solution, a heater 8 for the reboiler 1, and a coolant duct 9 of condenser 5.

The rich solution enters the distillation unit at the pipe connection 10 and flows through the duct 6 from the top downwards. It accepts heat from the stripped solution which flows in duct 7 from the bottom upwards, as well as dephlegmate-heat from the vapor which flows in the rectifying column 4 from the bottom upwards. In the rich zone 3, the gaseous and volatile components of the feed solution separate, while the gaseous parts, together with the vapors rising from the stripping section 2 flow upwards through the rectifying section 4—and thereby dephlegmate on the wall of the duct 6—the rich solution follows the force of gravity through the stripping section 2 downwards and is further evaporated. The vapors rising from the reboiler 1 as well as the heat transmitted by the stripped solution from duct 7, are being utilized for the reheating.

In the example illustrated, the stripped solution collected in the reboiler 1 is further reheated by means of a heating fluid which flows in the heater 8, and the more volatile components are expelled. The vapor flows through the stripping section 2 and the rectifying section 4, while the then stripped solution leaves the reboiler 1 via flow duct 7 and transfers the heat first to the stripping section 2 and then to the rich solution—in the area of flow duct 6—, before it leaves the rectifying unit at pipe connection 11.

The vapor which exits from the rectifying section 4 is deposited in condensor 5 on the cold wall of coolant duct 9, the condensate leaves the rectification unit by means of pipe connection 12. The cooling fluid which is utilized for the condensation is fed into channel 9 by means of connections 13 and 14.

The helical ribs 15 which are arranged in the stripping section 2 and the rectifying section 4 serve simultaneously for guiding the flow and the availability of the wetted surface area for the material exchange.

The flow ducts 6 and 7 are divided into first, second and third ducts, i.e., flow duct 6 is the second duct; that portion of flow duct 7 adjacent flow duct 6 is the first duct; and the remainder of flow duct 7 is the third duct. The wall of the first duct adjacent the second duct is called a first heat exchanger; the wall of the second duct adjacent the rectifying section is called a second heat exchanger; and the wall of the third duct adjacent the stripping section is called a third heat exchanger.

I claim:

1. In a distillation process in which a liquid mixture of several components having different volatilities is introduced into the process through a feed zone and is divided by partial condensation into a vapor phase of high concentration of more readily volatile components as a recovered product and a liquid phase with low concentration of the more readily volatile components, the vapor phase being brought into intimate contact with a reflux produced by partial condensation in order to obtain an enrichment of the more readily volatile components in the vapor phase, the vapor formed by external heating and exchanging concentration for the liquid phase of the mixture in order to strip the mixture of the more readily volatile component to the greatest extent possible, the improvement being in a non-adiabatic distillation process having the steps of transferring the total heat of condensation for the reflux from the vapor phase to a heat sink by continuously extracting said reflux heat of condensation over the entire region of a rectifying section downstream of said feed zone with respect to vapor flow in order to maintain the heat balance at any point in said rectifying section, whereby the vapor phase is passed along the dewpoint curve of said vapor; and initiating a stripping step by continuously introducing reboil heat over the entire region of a stripping section into said stripping section, wherein said stripping section is upstream of the feed zone with respect to vapor flow, in order to maintain the heat balance at any point in said stripping section, whereby the liquid phase is passed along the bubble-point curve of said liquid mixture; and recovering said stripped liquid phase and vapor phase.

2. The process according to claim 1, in which said reboil and reflux heat required for heating and cooling respectively is made available by fluid streams, one stream for heating and one for cooling.

3. The process according to claim 2 in which said fluid streams used for heating and cooling flow in counterflow to the vapor phase in said rectifying section and to the liquid phase in the stripping section.

4. The process according to claims 1, 2 or 3 in which said liquid mixture to be separated is used as said heat sink for the production of the reflux.

5. The process according to claims 2 or 3 in which the stripping liquid phase of said liquid mixture is used as the heating fluid for carrying out said stripping step.

6. An apparatus for carrying out a non-adiabatic distillation process wherein a solution rich in high volatile components is separated into a vapor phase and a stripped solution, the apparatus comprising: a feed inlet to a feed zone for the rich solution; a rectifying section downstream of the direction of flow of said vapor phase with respect to said feed zone; a stripping section upstream the direction of flow of said vapor phase with respect to said feed zone; a reboiler upstream the direction of flow of said vapor phase with respect to said feed zone and having means to draw off said stripped solution; a first heat exchanger for transferring heat from said stripped solution to the rich solution; a second heat exchanger for transferring heat from said rectifying section to said rich solution; and a third heat exchanger for transferring heat from said stripped solution to said stripping section; at least one flow duct for said rich solution defined by said first and second heat exchanger; and a means for recovering said vapor phase and said stripped solution.

7. The apparatus as claimed in claim 6, wherein said first, second and third heat exchangers are part of first, second and third annular ducts which are co-axial, said first and second being concentric and surrounding said rectifying section; said third duct surrounding said stripping section and connecting to said first duct.

8. The apparatus as claimed in claim 7, wherein said rich solution flows through said second duct to said feed zone; said stripped solution flows through said third duct and said first duct to said means for recovering said stripped solution; and said first duct is radially outward of said second duct and the heat exchange therebetween is carried out by said first heat exchanger.

9. The apparatus according to claims 6, 7, wherein the rectifying section and the stripping section are provided with flow-guiding elements.

* * * * *